US008761477B2

(12) United States Patent
Walker et al.

(10) Patent No.: US 8,761,477 B2
(45) Date of Patent: Jun. 24, 2014

(54) SYSTEMS AND METHOD FOR ADAPTIVE BEAMFORMING FOR IMAGE RECONSTRUCTION AND/OR TARGET/SOURCE LOCALIZATION

(75) Inventors: William F. Walker, Earlyville, VA (US); Francesco Viola, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1617 days.

(21) Appl. No.: 11/992,368

(22) PCT Filed: Sep. 19, 2006

(86) PCT No.: PCT/US2006/036536
§ 371 (c)(1),
(2), (4) Date: Mar. 1, 2010

(87) PCT Pub. No.: WO2007/035765
PCT Pub. Date: Mar. 29, 2007

(65) Prior Publication Data
US 2010/0142781 A1     Jun. 10, 2010

Related U.S. Application Data

(60) Provisional application No. 60/718,290, filed on Sep. 19, 2005.

(51) Int. Cl.
*G06K 9/00* (2006.01)
*H04W 8/02* (2009.01)

(52) U.S. Cl.
USPC .......................................... 382/131; 370/342

(58) Field of Classification Search
USPC .......................................... 382/131; 370/342
See application file for complete search history.

(56) References Cited

U.S. PATENT DOCUMENTS

| 5,546,360 | A | 8/1996 | Deegan |
| 6,242,743 | B1 | 6/2001 | DeVito et al. |

(Continued)

FOREIGN PATENT DOCUMENTS

| WO | WO-2007035765 A2 | 3/2007 |
| WO | WO-2007035765 A3 | 3/2007 |
| WO | WO-2010151809 A1 | 12/2010 |

OTHER PUBLICATIONS

Lo et al.,Adaptive Array Processing for Wide-Band Active Sonars. pp. 837-846, vol. 29, No. 3, Jul. 2004.

(Continued)

*Primary Examiner* — Robert Morgan
*Assistant Examiner* — Maroun Kanaan
(74) *Attorney, Agent, or Firm* — Schwegman, Lundberg & Woessner, P.A.

(57) ABSTRACT

Methods, systems and computer readable media for reconstruction of target locations and amplitudes from signals received from one or more real targets in a space are provided, wherein the signals are at least one of signals received from the near-field and broadband signals. The space is modeled as a region of interest, and an array manifold matrix is calculated from signals received from hypothetical targets in the region of interest. One or more signal vectors received from the one or more real targets are reshaped into a data vector. A hypothetical target configuration is identified that, when applied to a signal model comprising the array manifold matrix, matches the data vector, a reconstruction vector is calculated. The reconstruction vector is reshaped into a reconstructed representation of the real targets in the space, and at least one of outputting the reconstructed representation for viewing by a user, and storing the reconstructed representation for later use are performed.

25 Claims, 21 Drawing Sheets

(56) References Cited

U.S. PATENT DOCUMENTS

| | | | |
|---|---|---|---|
| 6,398,733 | B1 | 6/2002 | Simopoulos et al. |
| 6,501,747 | B1 * | 12/2002 | Friedlander et al. ......... 370/342 |
| 6,579,238 | B1 | 6/2003 | Simopoulos et al. |
| 6,692,439 | B1 | 2/2004 | Walker et al. |
| 7,402,136 | B2 | 7/2008 | Hossack et al. |
| 7,699,766 | B2 | 4/2010 | Ellsworth et al. |
| 7,750,537 | B2 | 7/2010 | Hossack et al. |
| 7,822,119 | B2 * | 10/2010 | Boon et al. ............... 375/240.12 |
| 8,057,392 | B2 | 11/2011 | Hossack et al. |
| 8,121,354 | B2 | 2/2012 | Nagasaka et al. |
| 2003/0133601 | A1 | 7/2003 | Giger et al. |
| 2006/0058666 | A1 | 3/2006 | Tanigawa |
| 2007/0016022 | A1 | 1/2007 | Blalock et al. |
| 2007/0057671 | A1 * | 3/2007 | Nezafat et al. ................ 324/306 |
| 2010/0256952 | A1 | 10/2010 | Dekker |
| 2010/0331686 | A1 | 12/2010 | Hossack et al. |
| 2012/0163691 | A1 | 6/2012 | Walker et al. |

OTHER PUBLICATIONS

"European Application Serial No. 06814967, Response filed Oct. 15, 2010 to Office Action mailed Jun. 16, 2010", 22 pgs.

"European Application Serial No. 06814967.3, Extended European Search Report mailed Mar. 5, 2010", 3 pgs.

"European Application Serial No. 06814967.3, Office Action mailed Mar. 23, 2010", 5 pgs.

"European Application Serial No. 06814967.3, Office Action mailed Jun. 16, 2010", 1 pgs.

"International Application Serial No. PCT/US2006/036536 , International Preliminary Report on Patentability mailed Mar. 26, 2008", 5 pgs.

"International Application Serial No. PCT/US2006/036536, Written Opinion mailed May 15, 2007", 4 pgs.

"European Application Serial No. 06814967.3, Examination Notification Art. 94(3) mailed Mar. 8, 2013", 5 pgs.

"International Application Serial No. PCT/US10/40054, Search Report mailed Aug. 23, 2010", 4 pgs.

"International Application Serial No. PCT/US10/40054, Written Opinion mailed Aug. 23, 2010", 8 pgs.

"International Application Serial No. PCT/US2010/040054, International Preliminary Report on Patentability mailed Jan. 12, 2012", 10 pgs.

Ellis, Michael A, et al., "Super-Resolution Image Reconstruction With Reduced Computational Complexity", 2009 IEEE International Ultrasonics Symposium Proceedings, (2009), 2351-2354.

Mann, J. A, et al., "A Constrained Adaptive Beamformer for Medical Ultrasound", 2002 IEEE Ultrasonics Symposium, 2002. Proceedings, vol. 2, (2002), 1807-1810.

Viola, et al., "Time-Domain Optimized Near-Field Estimator for Ultrasound Imaging : Initial 1-40", IEEE Transactions on Medical Imaging 27(1), (Jan. 2008), 99-110.

Bethel et al., Single Snapshot Spatial Processing: Optimized and Constrained. p. 508-512, 2002.

Lo et al., Adapttive Array Processing for Wide-Band Active Sonars. pp. 837-846, vol. 29, No. 3, Jul. 2004.

Viola F. et al., Adaptive Signal Processing in Medical Ultrasound Beamforming. vol. 4, pp. 18-21, Sep. 21, 2005.

"U.S. Appl. No. 13/380,224, Non Final Office Action mailed Sep. 19, 2013", 11 pgs.

* cited by examiner

SYSTEMS AND METHOD FOR ADAPTIVE BEAMFORMING FOR IMAGE RECONSTRUCTION AND/OR TARGET/SOURCE LOCALIZATION

This invention was made with government support under federal Grant No. W81XWH-04-1-0590 awarded by the U.S. Army Congressionally Directed Medical Research Program. The United States Government has certain rights in this invention.

This application claims priority to U.S. Provisional Application No. 60/718,290 filed Sep. 19, 2005, entitled "Method and System for Adaptive Beamforming for Medical Ultrasound Imaging", which is hereby incorporated by reference herein in its entirety.

FIELD OF THE INVENTION

The present invention relates to imaging devices and techniques. More specifically, the various embodiments of the present invention provide a novel image formation system and method that allows for near field and/or time domain imaging and localization applications.

BACKGROUND OF THE INVENTION

Sensor arrays are used in many application fields including RADAR, SONAR, geophysics, telecommunications and medical imaging. For these applications, the received data is often processed using so-called conventional "delay-and-sum" beamforming to localize source or target locations. While this approach is straightforward and easy to implement, off-axis scatters, known as jammers in the RADAR/SONAR literature, can introduce clutter, reducing the overall quality of the beamformer output. This is shown schematically and with actual and simulated images formed using delay and sum beamforming processing, by comparing FIGS. 1A-1C. In FIGS. 1A-1C, an array 10 of sensors 12 is focused along an axis 1 in a direction indicated by the arrow that is often referred to as the "look direction". In FIG. 1A, a single target ("single point" target) has been placed along the look direction, on axis 1 at a fixed distance from array 10. As the target 2 either emits or reflects energy toward the array 10, a signal is received by each of the individual sensors 12. Focal delays ($T_1$-$T_3$) are applied to each signal received, corresponding to the relative distances of the respective sensors from axis 1 and as a function of the distance of target 2 from array 10, from which the sensor/range set of data 6 is produced as shown in the image portion of FIG. 1A. Summation across sensors 12 to form an image line amplifies the signal coming from the look direction.

However, when a secondary target 2' is placed off-axis, as shown in FIG. 1B, it may lie within the array's beam and energy emitted or reflected from target 2' toward array 10 may contribute to corrupt the desired image information from target 2. This is represented by the tilted waveforms 7 visible in the sensor/range data set image shown in FIG. 1B. Although summation across sensors would amplify the signal coming from directly in front of the array 10, it would not entirely eliminate the contribution of the off-axis target 2'.

FIG. 1C shows an image of medical ultrasound data obtained from the thyroid of a human subject. At least three clear waveforms 6, 7 and 8 are visible in this sensors/range data set image. Thus, non-focal targets appear in this image line as clutter, reducing image contrast, and reducing clarity of the image 6 of the on-axis target that is desired to be visualized. FIG. 1C shows focused single channel radio frequency (RF) echo data obtained from the thyroid of a human subject at Duke University, United States of America. The vertical axis represents channel number (sensor), while the horizontal axis represents arrival times of the signals. Although summation across channels (i.e., conventional beamforming) to form an RF image line would amplify the echo 6 coming from directly in front of the array, it would not entirely eliminate the two other visible targets 7 and 8. These non-focal targets would appear in this image line as clutter, reducing image contrast. In addition to the three dominant waveforms 6, 7 and 8 the data set also includes echoes from background speckle. These background echoes also include discernable off-axis scatterers that generate further clutter in the image. The successful application of adaptive beamforming to medical ultrasound would reduce the effects of bright off-axis targets, thus improving the overall image quality.

The problem of nullifying the contribution of jammers was first investigated for RADAR and SONAR systems by extending the pioneering work of Norbert Wiener. The application of Wiener filter theory to array signal processing led to the initial development of adaptive beamforming [1-3]. In adaptive beamforming, the information associated with the data received by an array of sensors is used to determine a set of weights that optimize the beamformer output.

In the past fifty years, a plethora of algorithms have been developed, each exploiting specific properties of the received data. These algorithms are able to achieve resolution far superior to that predicted by diffraction theory, while attaining excellent side lobe reduction (i.e., image contrast). The most common approaches calculate the weights by minimizing the energy in the beamsum signal, subject to the constraint that the beamformer must exhibit a given response in the look-direction [4, 5]. Typically, the second order statistics (i.e., the covariance matrix) of the data are used to generate the weights. These algorithms were initially applied in passive SONAR, where the use of receive only systems allowed one to obtain numerous unique statistical looks at the environment. This is not generally the case for a transmit/receive system, such as those employed in medical ultrasound.

In parallel with the development of these "statistical beamformers", alternative algorithms were also developed which utilized different properties of the received signals. Common approaches include the reduced rank beamformers [6-8]. The basic concept underlying these methods is to save computation time by calculating a reduced rank covariance matrix that only includes the strongest jammers. Oblique projections have also been proposed to beamform the data in a signal space which is orthogonal to the signal space spanned by the jammers [9, 11].

It is often the case that limited data are available, making computation of a reliable covariance matrix difficult. This could be due, for example, to non-stationary environments, fast moving targets, or the application of transmit/receive systems. In these cases, several groups have proposed the use of a diagonal loading term to obtain a stable covariance matrix which allows solution for the optimal weights [12-15]. Diagonal loading is a common technique in array signal processing to stabilize a matrix ill-conditioned for inversion. Along with these so-called "regularization approaches", a series of adaptive algorithms has also been developed which do not rely on statistical properties of the data and thus can be used on a single realization (or snapshot). These approaches are particularly well suited to pulse-echo imaging. These algorithms include techniques based on generalized eigenvalue problems [16, 17], Bayesian approaches [18-20], maximum likelihood estimators [21, 22], data-adaptive regularization [23], and minimum worst-case gain methods [24]. The Spatial Processing Optimized and Constrained (SPOC) algorithm was first described by Van Trees et al. in [18] for applications in passive SONAR systems, assuming narrowband signals received from the far-field. In passive SONAR the received data x is simply an N element vector of the complex demodulated signals received on each channel. Since passive SONAR assumes narrow-band signals, this received data consists of only a single complex sample on each channel. Thus, the signals, originating from the far-field, are assumed to be received in a linear progression of arrival times. Further, the narrow band nature of the analysis involves the selection of a single frequency of signals to be processed. The signal from a single far-field target received by a uniformly spaced linear array takes on the form of a discretely sampled complex exponential. The array manifold matrix for this application thus consists of a set of Q columns, each of which is an N sample complex exponential of a different frequency (Q is the number of hypothetical sources placed in the far-field).

In medical ultrasound, bright off-axis targets can seriously degrade image quality by introducing broad image clutter, which reduces image contrast and resolution. It is well known that the acoustic reflectivity of targets within the body covers many orders of magnitude [25]. The unique characteristics of ultrasound data make blind application of existing adaptive beamforming algorithms unlikely to be successful. Unlike passive SONAR, for example, limited statistics are available in medical ultrasound to form a robust covariance matrix. This is particularly pronounced when the target includes non-stationary environments, such as is often the case when attempting to view living tissue. Furthermore, on-axis and off-axis signals are strongly correlated, requiring the use of special algorithms such as the Duvall beamformer [26] or pre-processing techniques such as spatial smoothing to decorrelate signals before filtering is applied [27-31]. Lastly, ultrasound imaging is generally performed using broad-band signals in the near-field, while many adaptive beamforming techniques are specifically designed for narrow-band signals in the far-field.

In the past, several groups have applied adaptive algorithms to medical ultrasound beamforming Mann and Walker [32, 33] showed an increased resolution and contrast using a modified version of the Frost beamformer [5]. Other groups [34, 35] have applied the Capon beamformer [4] coupled with spatial smoothing to decorrelate on-axis and off-axis signals. Synthetic transmit focusing was used in these approaches to generate a robust covariance matrix. Although initial results are positive, the use of synthetic transmit poses significant limits on the application of these algorithms in real clinical environments because of potential motion artifacts and limitations of existing hardware.

Most adaptive beamforming algorithms, such as those previously described, tend to fail when applied to medical ultrasound data. Failure can be attributed to one or more of the following factors: the medical ultrasound data is procured in a near-field scenario; the signals obtained that make up the medical ultrasound data are broadband; and there is limited statistical information available, as noted. Medical ultrasound data is naturally processed in the time domain, and thus, existing algorithms require an extra step of selecting single frequency data for such processing.

Thus, there remains a need for systems and methods of improving medical ultrasonic imaging to reduce clutter in the resulting image to form a clearer image of the intended target. It would further be desirable and more natural to process medical ultrasonic image data as time-domain signals to thereby take advantage of the temporal coherence available in the data. Further, and more generally, there remains a need for systems and methods of improving imaging of signals received from near-field and/or broadband targets, as well as methods and system of localizing sources of such targets.

References

The following references as cited throughout are hereby incorporated by reference herein in their entirety:

[1] S. Haykin, "Adaptive Filter Theory," $4^{th}$ ed., Prentice-Hall, Upper Saddle River, N.J., 2002.

[2] B. D. Van Veen and K. M. Buckley, "Beamforming: A Versatile Approach to Spatial Filtering," *IEEE ASSP Magazine*, pp. 4-24, 1988.

[3] W. F. Gabriel, "Adaptive Processing Array Systems," *Proc. IEEE*, vol. 80, no. 1, pp. 152-162, 1992.

[4] J. Capon, "High resolution frequency-wavenumber spectrum analysis," *Proc. IEEE, vol.* 57, no. 8, pp. 1408-1418, 1969.

[5] O. L. Frost III, "An Algorithm for Linearly Constrained Adaptive Array Processing," *Proc. IEEE, vol.* 60, no. 8, pp. 926-935, 1972.

[6] W. F. Gabriel, "Using Spectral Estimation Techniques in Adaptive Processing Antenna Systems," *IEEE Trans. Antennas Propagat.*, vol. AP-34, no. 3, pp. 291-300, 1986.

[7] S. M. Kogon, "Experimental Results for Passive Sonar Arrays with Eigenvector-Based Adaptive Beamformers," *Thirty-Sixth Asilomar Conference on Signals, Systems and Computers*, vol. 1, pp. 439-447, 2002.

[8] D. A. Abraham and N. L. Owsley, "Beamforming with Dominant Mode Rejection," *Proceedings of the Oceans Conference*, pp. 470-475, 1990.

[9] H. Subbaram and K. Abend, "Interference Suppression Via Orthogonal Projections: A Performance Analysis," *IEEE Trans. Antennas Propagat.*, vol. 41, no. 9, pp. 1187-1194, 1993.

[10] R. T. Behrens and L. L. Sharf, "Signal Processing Applications of Oblique Projection Operators," *IEEE Trans. Signal Proc.*, vol. 42, no. 6, pp. 1413-1424, 1994.

[11] D. D. Feldman and L. J. Griffiths, "A Projection Approach for Robust Adaptive Beamforming," *IEEE Trans. Signal Proc.*, vol. 42, no. 4, pp. 867-876, 1994.

[12] P. Stoica, Z. Wang, and J. Li, "Robust Capon Beamforming," *IEEE Trans. Signal Proc. Letters*, vol. 10, no. 6, pp. 172-175, 2003.

[13] H. Cox, "Adaptive Beamforming in Non-Stationary Environments *Thirty-Sixth Asilomar Conference on Signals, Systems and Computers*, vol. 1, pp. 431-438, 2002.

[14] M. V. Greening and J. E. Perkins, "Adaptive beamforming for nonstationary arrays," *J. Acoust. Soc. Am.*, vol. 112, no. 6, pp. 2872-2881, 2002.

[15] P. Gerstoft, W. S. Hodgkiss, W. A. Kuperman, H. Song, M. Siderius, and P. L. Nielsen, "Adaptive Beamforming of a Towed Array During a Turn," *IEEE J. Oceanic Eng.*, vol. 28, no. 1, pp. 44-54, 2003.

[16] M. E. Ali and F. Schreib, "Adaptive Single Snapshot Beamforming: A New Concept for the Rejection of Non-stationary and Coherent Interferers," *IEEE Trans, Signal Proc.*, vol. 40, no. 12, pp. 3055-3058, 1992.

[17] T. K. Sarkar, S. Park, J. Koh, and R. A. Schneible, "A Deterministic Least Squares Approach to Adaptive Antennas," *Digital Signal Proc.*, vol. 6, pp. 185-194, 1996.

[18] R. Bethel, B. Shapo, and H. L. Van Trees, "Single Snapshot Spatial Processing: Optimized and Constrained," *Sensor Array and Multichannel Signal Processing Workshop Proceedings*, pp. 508-512, 2002.

[19] M. Viberg and A. L. Swindlehurst, "A Bayesian Approach to Auto-Calibration for Parametric Arrays Signal Processing," *IEEE Trans. Signal Proc.*, vol. 42, no. 12, pp. 3495-3507, 1994.

[20] B. M. Radich and K. M. Buckley, "Single-Snapshot DOA Estimation and Source Number Detection," *IEEE Trans. Signal Proc.*, vol. 4, no. 4, pp. 109-111, 1997.

[21] E. Cekli and H. A. Cirpan, "Deterministic Maximum Likelihood Method for the Localization of Near-Field Sources: Algorithm and Performance Analysis," *8th IEEE International Conference on Electronics, Circuits and Systems*, vol. 2, pp. 1077-1080, 2001.

[22] M.-W. Tu, I. J. Gupta, and E. K. Walton, "Application of Maximum Likelihood Estimation to Radar Imaging," *IEEE Trans. Antennas Propagat.*, vol. 45, no. 1, pp. 20-27, 2002.

[23] D. M. Malioutov, M. Cetin, J. W. Fisher III, and A. S. Willsky, "Superresolution Source Localization Through Data-Adaptive Regularization," *Sensor Array and Multichannel Signal Processing Workshop Proceedings*, pp. 194-198, 2002.

[24] R. T. O'Brien and K. Kiriakidis, "Single-Snapshot Robust Direction Finding," *IEEE Trans. Signal Proc.*, vol. 53, no. 6, pp. 1964-1978, 2005.

[25] K. K. Shung and G. A. Thieme, "Ultrasonic Scattering in Biological Tissues," CRC Press, 1993.

[26] B. Widrow, K. M. Duvall, R. P. Gooch, and W. C. Newman, "Signal Cancellation Phenomena in Adaptive Antennas: Causes and Cures," *IEEE Trans. Antennas Propagat.*, vol. AP-30, no. 3, pp. 469-478, 1982.

[27] M. Agrawal and S. Prasad, "Robust Adaptive Beamforming for Wide-Band, Moving, and Coherent Jammers via Uniform Linear Arrays," *IEEE Trans. Antennas Propagat.*, vol. 47, no. 8, pp. 1267-1275, 1999.

[28] Y.-L. Su, T.-J. Shan, and B. Widrow, "Parallel Spatial Processing: A Cure for Signal Cancellation in Adaptive Arrays," *IEEE Trans. Antennas Propagat.*, vol. AP-34, no. 3, pp. 347-355, 1986.

[29] A. K. Luthra, "A Solution to the Adaptive Nulling Problem with a Look-Direction Constraint in the Presence of Coherent Jammers," *IEEE Trans. Antennas Propagat.*, vol. AP-30, no. 5, pp. 702-710, 1986.

[30] F. Qian and B. D. Van Veen, "Partially Adaptive Beamforming for Correlated Interference Rejection," *IEEE Trans. Signal Proc.*, vol. 43, no. 3, pp. 506-515, 1995.

[31] T.-J. Shan and T. Kailath, "Adaptive Beamforming for Coherent Signals and Interference," *IEEE Trans. Acoust., Speech, Signal Processing*, vol. ASSP-33, no. 3, pp. 527-536, 1985.

[32] J. A. Mann and W. F. Walker, "Constrained Adaptive Beamforming: Point and Contrast Resolution," *Proc. SPIE*, vol. 5035, 2003.

[33] J. A. Mann and W. F. Walker, "A constrained adaptive beamformer for medical ultrasound: initial results," *IEEE Ultrasonic Symposium*, 2002.

[34] Z. Wang, J. Li, and R. Wu, "Time-Delay- and Time-Reversal-Based Robust Capon Beamformers for Ultrasound Imaging," *IEEE Trans. Med. Imag.*, vol. 24, no. 10, pp. 1308-1322, 2005.

[35] J.-F. Synnevag, A. Austeng, and S. Holm, "Minimum variance adaptive beamforming applied to medical ultrasound imaging," *IEEE Ultrasonic Symposium*, 2005.

[36] K. W. Lo, "Adaptive Array Processing for Wide-Band Active Sonars," *IEEE J. Oceanic Eng.*, vol. 29, no. 3, pp. 837-846, 2004.

[37] J. A. Jensen and N. B. Svendsen, "Calculation of Pressure Fields from Arbitrarily Shaped, Apodized, and Excited Ultrasound Transducers," *IEEE Trans. Ultrason., Ferroelect., Freq. Cont.*, vol. 39, no. 2, pp. 262-267, 1992.

[38] R. F. Wagner, S. W. Smith, J. M. Sandrik, and H. Lopez, "Statistics of Speckle in Ultrasound B-Scans," *IEEE Trans. Sonics and Ultrason.*, vol. 30, no. 3, pp. 156-163, 1983.

SUMMARY OF THE INVENTION

Methods, systems and computer readable media for reconstruction of target locations and amplitudes from signals received from one or more real targets in a space are provided, wherein the signals are at least one of signals received from the near-field and broadband signals. The space is modeled as a region of interest, and an array manifold matrix is calculated from signals received from hypothetical targets in the region of interest. One or more signal vectors received from the one or more real targets are reshaped into a data vector, and a hypothetical target configuration is identified that, when applied to a signal model comprising the array manifold matrix, matches the data vector, to calculate a reconstruction vector. The reconstruction vector is reshaped into a reconstructed representation of the real targets in the space, and at least one of outputting the reconstructed representation for viewing by a user, and storing the reconstructed representation for later use are performed.

Systems and methods are also provided wherein the system integrates a system for receiving signals from one or more targets with a system for reconstruction of target locations and amplitudes from signals received from as described above.

The reconstructed representation may be a reconstructed image of the real targets in the space.

In at least one embodiment, the reconstructed representation can be used for localization of the real targets in the space.

In at least one embodiment, the real targets are targets within a patient's tissue, and the reconstructed representation is a reconstructed ultrasonic image of the real targets.

In at least one embodiment, the data vector is calculated from temporal waveforms of the signal vectors received.

In at least one embodiment, the data vector is calculated from frequency domain representations of the signal vectors received.

In at least one embodiment, the identifying comprises applying a MAP algorithm to the data vector and signal model.

In at least one embodiment, the real targets are in a near-field space.

In at least one embodiment, the signals making up the signal vectors received are broadband signals.

In at least one embodiment, the array manifold matrix is calculated by: (a) placing a single calibration target in the region of interest; (b) reshaping signals received from the single calibration target to form a single column of the array manifold matrix; (c) moving the single calibration target to a different location in the region of interest; (d) reshaping signals received from the single calibration target in its current location to form another column of the array manifold matrix; and (e) repeating steps (c) and (d) until all columns of the array manifold matrix have been filled.

In at least one embodiment, the array manifold matrix is calculated by: (a) placing a single calibration target in the region of interest; (b) reshaping signals received from the single calibration target to form a single column of the array manifold matrix; (c) modifying the signals received from the single calibration target to account for a known physical effect; (d) reshaping the modified signals to form another column of the array manifold matrix; and (e) repeating steps (c) and (d) until all columns of the array manifold matrix have been filled.

In at least one embodiment, the array manifold matrix is calculated by performing a computer simulation to model signals received from a calibration target at various hypothetical target locations, and reshaping the computer signals simulated from the various hypothetical target locations to form columns of the array manifold matrix, wherein each column of the array manifold matrix is generated from signals simulated from each different hypothetical target location, respectively.

In at least one embodiment, the hypothetical targets each comprise a set or a continuum of calibration targets filling an area around a central target location. The calibration targets may be weighted to emphasize the central target location.

In at least one embodiment, signals making up the signal vectors from the one or more real targets are from non-linearly propagating waves emitted or reflected from the one or more real targets.

In at least one embodiment, the reconstructed representation is superimposed on an image formed using a different method than that of the present invention, as an output for viewing by a user, or the image formed using a different method is modified with the reconstructed representation.

A system for reconstructing target locations and amplitudes from signals received from one or more real targets in a space is provided, wherein the signals are at least one of signals received from the near-field and broadband signals.

The system includes: a processor; an interface configured to receive signals originating from the one or more real targets; programming configured to perform the following steps: modeling the space as a region of interest; calculating an array manifold matrix from signals received from hypothetical targets in the region of interest; reshaping one or more signal vectors received from the one or more real targets into a data vector; identifying a hypothetical target configuration that, when applied to a signal model comprising the array manifold matrix, matches the data vector, and calculating a reconstruction vector; and reshaping the reconstruction vector into a reconstructed representation of the real targets in the space; the system further including at least one of a storage device for outputting to and storing the reconstructed representation; or an interface for outputting the reconstructed spatial representation for viewing by a user.

In at least one embodiment, the system further includes an array of sensors for receiving signals emitted from or reflected by the real targets.

In at least one embodiment, the system further includes a storage device for storing signals received from the real targets, wherein the processor receives the signals from the storage device via the interface for processing offline.

In at least one embodiment, the processor receives the signals for direct processing after sensing by the sensors and intermediate signal processing by the system.

In at least one embodiment, the sensors are ultrasonic sensors configured for medical ultrasonic imaging.

In at least one embodiment, the system is configured for reconstructing target locations and amplitudes from signals received from one or more real targets in a near-field space.

In at least one embodiment, the signals originating from the one or more real targets are broadband signals.

In at least one embodiment, the signals received by the processor have been previously processed for image reconstruction by a image processing algorithm different from that of the present invention.

These and other advantages and features of the invention will become apparent to those persons skilled in the art upon reading the details of the methods, systems and computer readable media as more fully described below.

DETAILED DESCRIPTION OF THE INVENTION

Figure 1A:
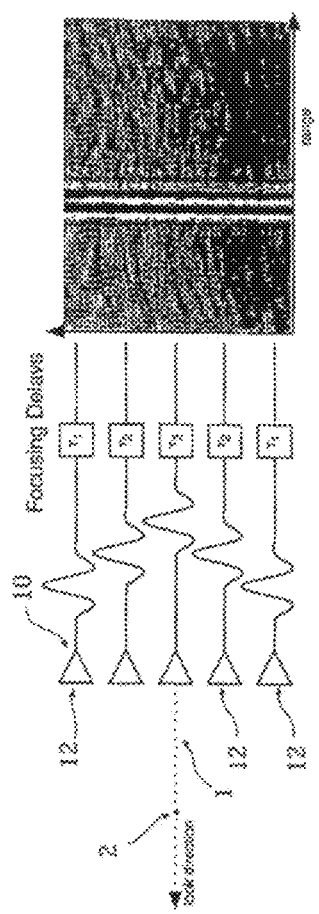
FIGS. 1A-1C illustrate, schematically and with images, images formed using delay and sum beamforming processing.
Figure 1B:
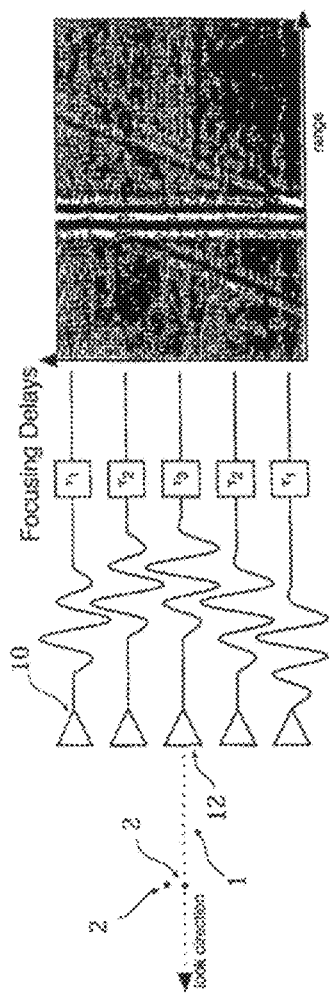
Figure 1C:
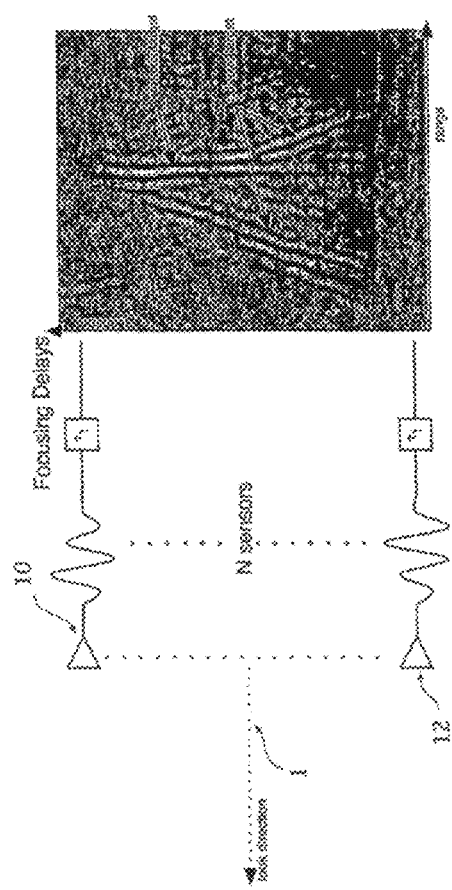

Before the present systems, methods and computer readable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a transducer" includes a plurality of such transducers and reference to "the processor" includes reference to one or more processors and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

"Adaptive beamforming" as used herein, is constituent with it usage in the RADAR and SONAR technology fields, and not necessarily consistent with its usage in the ultrasonics field. As used herein, "adaptive beamforming" refers to beamforming by a system that adapts to some characteristic of the imaging environment. In the ultrasonics field, "adaptive beamforming" is sometimes used to refer to adaptation to speed of sound inhomogeneities in the imaging environment. The term "adaptive beamforming" is used more broadly herein, as it is used in SONAR and RADAR, to refer to a beamformer that adapts to minimize the contributions from targets lying in directions other than the look direction (i.e., axis along which the sensor array is focused).

"Near-field" is a term that is widely used in optics and array imaging or sensing application including RADAR, SONAR, and medical ultrasound. In these contexts a target lying in the near-field of a given aperture (or array) lies at a distance close enough to that aperture (or array) that if one plotted the arrival times of signals originating from the target as a function of position in the aperture (or array), the resultant data set would be a non-linear curve.

"Far-field" is a term that is widely used in optics and array imaging or sensing application including RADAR, SONAR, and medical ultrasound. In these contexts a target lying in the far-field of a given aperture (or array) lies at a distance far enough from that aperture (or array) that if one plotted the arrival times of signals originating from the target as a function of position in the aperture (or array), the resultant data set would be a linear curve. While the far-field does not exist in practical imaging systems, with the possible exception of space telescopes, in many cases it is practically advantageous to assume that a target lies in the far-field in order to simplify data processing steps by using a linear approximation for the arrival times of signals from that target.

Formally, the transition between the near-field and far-field regions can be said to occur, and is said to occur for purposes of the present disclosure, when the range of the target is much, much greater than $$\frac{\pi D^2}{\lambda},$$

see J. W. Goodman, *Introduction to Fourier Optics*, San Francisco: McGraw Hill, 1986, where D is the largest dimension of the aperture and $\lambda$ is the wavelength of the wave being used for imaging or sensing. Note that near-field targets are located closer to the aperture or array than this value, while far-field targets are located at this range or further away. It should be further noted that the transition point between near-field and far-field targets is not absolutely rigid, as the arrival time curve described above can never be exactly linear. As such, those of ordinary skill in the art will be able to readily identify the distinction between near-field and far-field targets in all but the very small subset of instances where targets are located near the transition.

"Broadband signal" refers to a signal that is composed of many frequencies. The term "broadband" is dependent upon the field in which the application is applied to. In some domains a broadband signal is any signal with greater than about 10% fractional bandwidth (the ratio of the range of frequencies to the center frequency). In the medical ultrasound field, it is common to refer to any signal with a fractional bandwidth greater than about 50% as a broadband signal. For the purposes of this application, any signal with fractional bandwidth greater than about 20% is referred to herein as a "broadband signal".

"Narrowband signal", for purposes of this application, refers to any signal with a fractional bandwidth less than or equal to about 20%.

"Envelope detected data" refers to data that has been complex demodulated, such that only the magnitude of the data has been retained. Mathematically, if the complex demodulated signal is represented as $I(t)+jQ(t)$ then the envelope of this signal, $E(t)$ is represented as $E(t) = \sqrt{(I(t)+jQ(t))(I(t)-jQ(t))} = \sqrt{I^2(t)+Q^2(t)}$.

"Complex demodulated data" is data resulting from complex demodulation, which is a process wherein a real signal, usually a radio frequency (RF) signal, is processed to yield a new representation of substantially the same data in the form of a pair of signals, each of which represents a portion of some underlying analytic signal. While the analytic signal itself is little more than a mathematical construct, it is a particularly valuable one, and therefore complex demodulation is applied widely in signal processing. In one mode of complex demodulation a digital Hilbert Transform is applied to the data to yield an imaginary signal that is exactly 90° out of phase with the original signal. This 90° phase shifted signal can be coupled with the input data (the original signal) to form an I/Q signal pair, also known as complex demodulated data. While there is a rich literature database describing the Hilbert Transform, one exemplary text is R. N. Bracewell, *The Fourier Transform and Its Applications*, New York: McCraw-Hill, Inc., 1986. In an alternate and more common method of performing complex demodulation that input signal is split into two paths, one of which is multiplied by a sine wave at the assumed center frequency of the input signal, while the second path is multiplied by a cosine wave at the same frequency. Each multiplicand is then low-pass filtered to eliminate any frequencies generated above the maximum frequency of the input signal. The choice of the cutoff frequency for the low-pass filter is somewhat arbitrary and dependent upon the bandwidth of the input signal. As with the Hilbert Transform method described above, the two output signals are paired such that one is considered the real portion of the analytical signal, while the other is considered the imaginary part of the signal. Together these signal components yield a set of complex demodulated data.

"IQ signals" refer to the signals that are outputted from a complex demodulator. Typically the input signal (radio frequency signal, in the case of medical ultrasonic imaging) is complex demodulated to yield two new signals, the so-called in-phase signal, referred to as "I", and the so-called quadrature signal, referred to as "Q". In standard mathematical terminology, the "I" signal is considered to be real, while the "Q" signal is considered to be imaginary, so the IQ pair is a single complex signal.

"FIR filter" refers to filters also known as "Finite Impulse Response" filters, and these types of filters are well known throughout the signal processing literature. Two exemplary texts that describe FIR filters are: A. V. Opppenheim and R. W. Schafer, *Discrete-Time Signal Processing*, Englewodd Cliffs, N.J.: Prentice Hall, Inc., 1989, and S. Haykin and B. Van Veen, *Signals and Systems*, 2 ed., Wiley, 2003.

A "hypothetical source" refers to a potential target or source within a space that is assigned during a method described herein during the construction of an array manifold matrix for use in determining where real targets are located within the space. In this way, a "hypothetical source" is a representation of a physical scatterer located at a specific location, but is hypothetical because an actual scatter may or may not be present at that location. The term "hypothetical target" is used interchangeably herein with "hypothetical source".

Description

Figure 2:
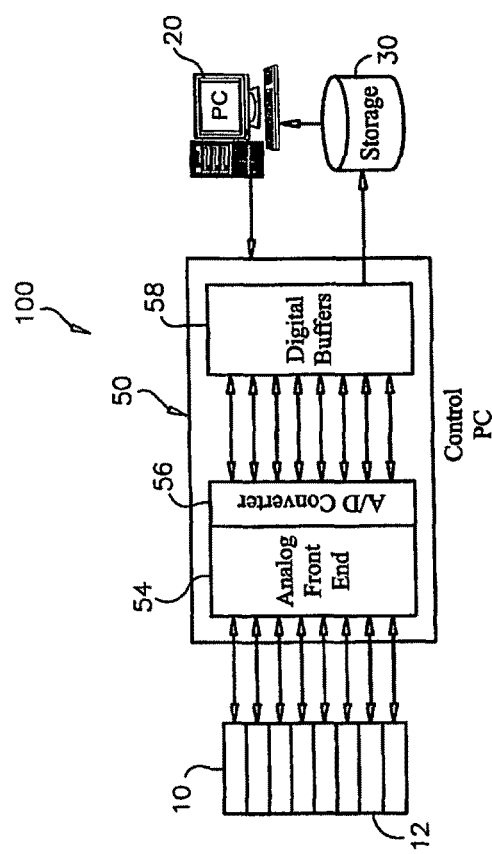
FIG. 2 is a schematic illustration of an embodiment of the present invention that includes a system for both data capture and image construction.

The present invention provides technical solutions to existing problems described above that were heretofore present when attempting to process medical ultrasound imaging data to provide a clear image of the target from which the data was obtained. As noted, the previously existing beamforming algorithms, such as those previously described, tend to fail when applied to medical ultrasound data. FIG. 2 is a schematic illustration of an embodiment of the present invention and is referred to here to describe the processes of both data capture and image construction, as they pertain to the present invention. A system for adaptive beamforming 20 for processing medical ultrasound image data received thereby is provided with programming for processing the data received to clarify an image defined by the data and to output the clarified image to a user, such as a human user or another computer system, for example. System 20 typically has its own storage including one or more storage devices, such as further described with regard to FIG. 3.

Figure 3:
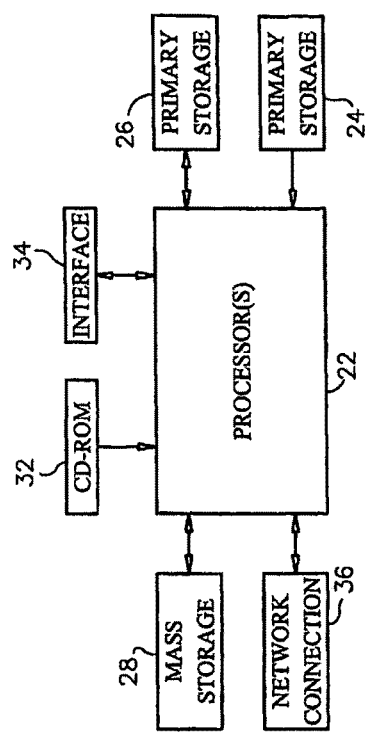
FIG. 3 is a schematic illustration of a typical computer system that may be used in a system for adaptive beamforming as described herein.

FIG. 3 is a schematic illustration of a typical computer system that may be used in a system for adaptive beamforming as described herein. The computer system includes at least one, and may include any number of processors 22 (also referred to as central processing units, or CPUs) that can run adaptive beamforming applications for example. Processor(s) 22 are coupled to storage devices including primary storage 26 (typically a random access memory, or RAM), primary storage 24 (typically a read only memory, or ROM). As is well known in the art, primary storage 24 acts to transfer data and instructions uni-directionally to the CPU and primary storage 26 is used typically to transfer data and instructions in a bi-directional manner. Both of these primary storage devices may include any suitable computer-readable media such as those described above. A mass storage device 28 is also coupled bi-directionally to CPU 22 and provides additional data storage capacity and may include any of the computer-readable media described above. Mass storage device 28 may be used to store programs, data and the like and is typically a secondary storage medium such as a hard disk that is slower than primary storage. Databases described herein may be stored on mass storage device(s) 28, and or on standalone storage devices that may be accessed by the computer system, such as storage device 30, described below, for example. It will be appreciated that the information retained within the mass storage device 28, may, in appropriate cases, be incorporated in standard fashion as part of primary storage 26 as virtual memory. A specific mass storage device such as a CD-ROM or DVD-ROM 32 may also pass data uni-directionally to the CPU 22.

CPU 22 is also coupled to an interface 34 that includes one or more input/output devices such as such as video monitors, track balls, mice, keyboards, microphones, touch-sensitive displays, transducers, card readers, magnetic or paper tape readers, tablets, styluses, voice or handwriting recognizers, and/or other well-known input devices such as, of course, other computers and/or imaging or sensing (e.g., for localization) systems, examples of which are described herein. CPU 22 optionally may be coupled to a computer or telecommunications network using a network connection as shown generally at 36. With such a network connection, it is contemplated that the CPU 22 might receive information from the network, or might output information to the network in the course of performing the above-described method steps. For example, one or more of the databases described herein may be provided on a server that is accessible by processor 22 over network connection 36. The above-described devices and materials will be familiar to those of skill in the computer hardware and software arts.

The hardware elements described above may implement the instructions of multiple software modules for performing the operations of this invention. For example, instructions for calculating an array manifold matrix may be stored on mass storage device 28 or 32 and executed on processor 22 in conjunction with primary memory 26.

Alternatively to performing the methods described herein on ore more processors executing software configured to perform the described method steps, system 20 and/or system 50 may be implemented in hardware using a rigidly configured digital system, or in firmware using reconfigurable hardware such as a FPGA (Field Programmable Gate Array).

Referring again to FIG. 2, system 20 may include external storage 30, as noted above, which may be a database, external hard drive, or the like that is directly accessible by CPU 22 either by wired or wireless communication, or accessible over a network, such as the Internet, for example, by wired or wireless connection. Input of the medical ultrasound image data may be direct to system 20 from the medical ultrasound imaging system 50. Alternatively, ultrasound imaging system 50 may store the ultrasound imaging data in storage device 30, and storage device 30 may be accessed by system 20 to receive the medical ultrasound imaging data as input for processing.

As a further embodiment, the present invention may be a system 100 that includes both the medical ultrasound imaging system 50 as well as adaptive beamforming system 20. Adaptive beamforming system 20 may be provided as an external computer system as shown, or may be integrated with the medical ultrasound imaging system 50. Optionally, an external storage system 30, such as a database or other external storage device may be included in system 100, or such additional storage device, such as a database may be incorporated into system 100. Still further, the additional storage may be remotely accessible, such as by access over the Internet, for example.

In the embodiment shown in FIG. 2, system 50 is an ultra high resolution instant-capture medical ultrasound system. System 50 is designed to acquire data from up to 256 channels simultaneously and to present the data for analysis, by outputting the data to storage  and/or outputting the data directly to system 20, as noted above. It should be noted here that system 20 is not limited to processing medical ultrasound image data from system 50 shown in FIG. 2**, but can be used to process medical ultrasound image data from other medical ultrasound imaging systems, either directly, or from a storage device that the other systems have outputted medical imaging data to. Examples of other such medical ultrasound imaging systems include, but are not limited to, those described in U.S. Pat. Nos. 6,743,175, 6,682,482, 6,602,195, 6,579,238, 6,517,489, 6,514,201, 6,497,666, 6,475,146, 6,398,733, 6,270,460, 6,200,267, 6,155,980, 6,146,328, 6,142,944, 6,139,500, 6,120,448, 6,120,446, 6,113,545, 6,045,504, 5,984,869, 5,976,088, 5,851,187, 5,619,998, 5,335,663, 5,271,403, 5,269,307, 5,235,857, 5,099,847, 4,887,306 and 4,276,779, each of which is incorporated herein, in its entirety, by reference thereto.

System 50 includes a transducer head that includes a transducer array 10 of a plurality of transducer elements 12. For example, transducer elements may be piezoelectric transducer elements, the fabrication of which is well-known in the art. Major ultrasound equipment manufacturers typically produce their own transducer elements, but such can also be obtained from third party manufacturers such as Blatek, Inc, State College Pa., USA, and Tetrad Corporation, Englewood, Colo., USA. Array 10 may be a one, two or three-dimensional array of elements 12. In the example shown in FIG. 2, it is a two-dimensional array. System 50 offers the ability to create a full image of a volume with a single capture, as contrasted with conventional ultrasonic imaging techniques that require scanning the transducer head, either manually or automatically. Rather, array 10 is designed to allow insonification of the entire volume to be imaged using one transducer element 12 at a time. Following insonification by one element 12, all elements 12 in the array 10 detect the returned reflection separately. The signals from these elements are passed through a massively parallel analog circuitry (Analog Front End) 54 and digitized by analog to digital converters 56. The individually digitized signals are buffered in digital buffers 58 before being outputted to storage 30 and/or outputted directly to system 20, as described above.

Processing the Data

Figure 4:
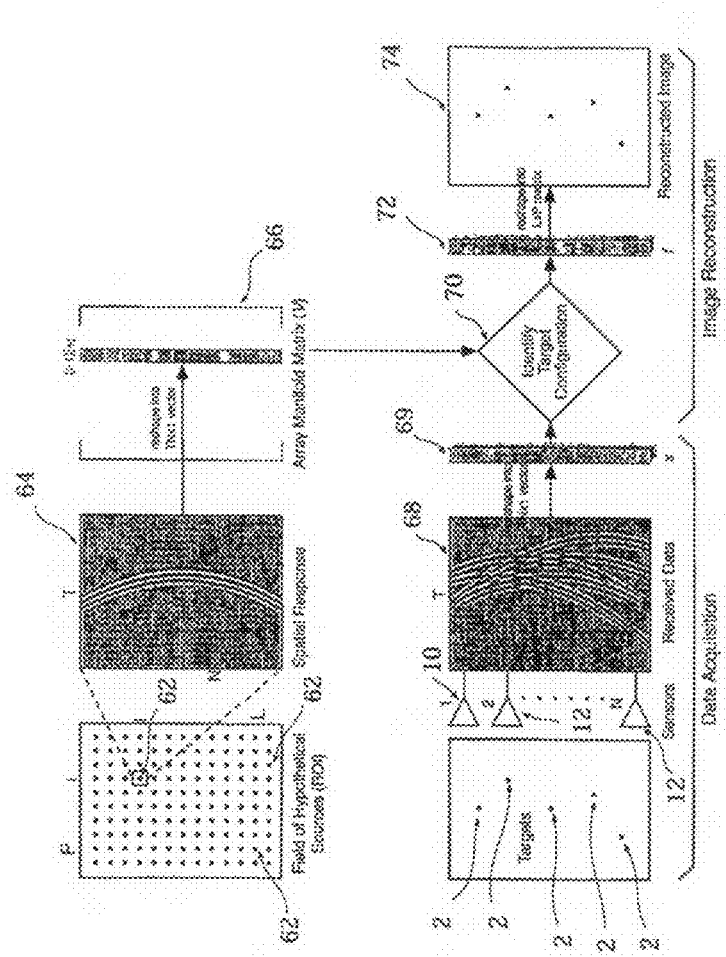
FIG. 4 is a schematic illustration of processing according to an embodiment of the present invention.
Figure 5:
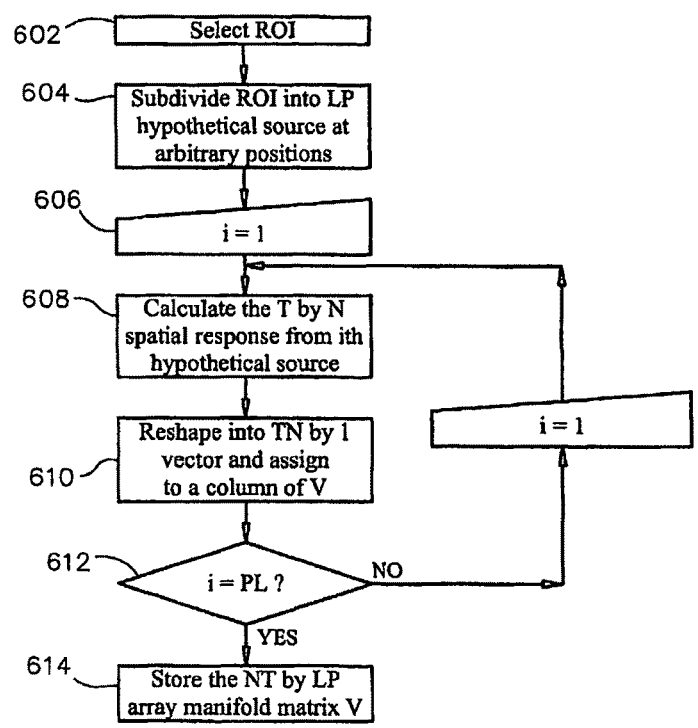
FIG. 5 shows a flowchart of events that are carried out in the formation of an array manifold matrix according to an embodiment of the present invention.

Referring now to FIG. 4, a schematic illustration of processing according to an embodiment of the present invention. After receiving the medical ultrasound imaging data from either storage 30 or directly from system 50, system 20 models an image composed by the ultrasonic medical image data received for that image as a region of interest (ROI) 60. It should be noted here that imaging data received from storage 30 may be either the raw signal data received from an imaging system, or it may be in the form of an image already having been beamformed, such as by one of the prior art beamforming algorithms described above, for example. Further, the imaging data received from storage may be subjected to pre-processing steps, such as filtering to reduce noise, prior to processing as described herein. ROI 60 is first subdivided into a collection of hypothetical sources 62 at arbitrary positions, as shown schematically in FIG. 4. Finer grid sampling yields finer final resolution but entails higher computational costs. For each hypothetical source 62 in the ROI 60, the hypothetical signal received by the array 10 is calculated for the specific point location corresponding to that hypothetical source 62. These hypothetical signals are referred to as the spatial impulse responses. For every hypothetical source 62, the spatial impulse response is a matrix 64 of dimensions T×N, where T is the number of samples in the axial, or temporal dimension (where the axial dimension is the dimension extending away from the array 10 and to the target, and the temporal dimension refers to the time record of signals outputted from a transducer element over the time span of sensing the target) and N is the total number of elements 12 in the array 10.

After the spatial impulse responses for all the hypothetical sources have been calculated, these responses are reshaped to form an array manifold matrix V 66 of dimensions NT×LP, where L and P are the numbers of hypothetical sources in the range and lateral dimensions, respectively, where the lateral dimension is the dimension normal to the look direction and the range dimension is the dimension perpendicular to the array face, often equivalent to the axial dimension. Thus, each spatial response is shaped to a column vector of the array manifold matrix V 66, as illustrated in FIG. 4. Having constructed the array manifold matrix V 66, the observation model becomes:

$$x = Vf \quad (1)$$

where $x=[x_1 \, x_2 \ldots x_N]^T$ is the data received by the N-element array and f is the LP×1 signal vector, whose elements are the amplitudes of the hypothetical sources located in the ROI 60. x is a NT×1 vector that is obtained by concatenating the T×1 channel data $x_i$. Regardless of whether the image input data is received from a one dimensional, two dimensional or three dimensional array of sensors/transducers, the data need to be force fitted into vectors and an array manifold matrix as described.

The received data 68 is reshaped into a TN×1 data vector x 69. Given x and V, system 20 identifies the target configuration that, when applied with the signal model, yields the closest match to the acquired data, i.e., data vector x. Thus, system 20 applies the data vector x 69 to the signal model (array manifold matrix V 66) to solve for the position and intensity of the real sources (i.e., targets 2), which are defined by the f vector 72. If there is no real source at a particular location within the ROI 60, then the element of f that corresponds to that location should be zero. One way of mathematically performing this identifying and solving is by applying the following maximum a posteriori (MAP) optimization problem 70 [18]:

$$\text{Cost function: } \sum_{l=1}^{LP} \ln|f_l|^2 \quad (2)$$

$$\text{subject to: } \underline{x} = V\underline{f}$$

where $f_i$ are elements of f.

A solution for the MAP optimization problem is found using the following iterative procedure [18, 36]:
1. Perform an eigen-decomposition of the matrix $V^H V = P\Lambda P^H$, where P contains the eigenvectors and $\Lambda = \text{diag}(\lambda_1, \lambda_2, \ldots \lambda_{LP})$ contains the eigenvalues in descending order. Note that the maximum rank of $V^H V$ is the number of sensors NT, therefore there will be at least LP-NT zero eigenvalues.

2. Divide the eigenvalues in two groups: the non zero ($\lambda_1, \lambda_2, \ldots, \lambda_{fix}$), and zero ($\lambda_{fix+1}, \lambda_{fix+2}, \ldots, \lambda_{LP}$).
3. Decompose the eigenvector matrix P into $P_{free}$ and $P_{fix}$, corresponding to the non zero and zero eigenvalues, respectively.
4. Compute $x'_{fix} = (VP_{fix})^H x$.
5. Compute $f'_{fix} = \Lambda_{fix}^{-1} x'_{fix}$, where $\Lambda_{fix}^{-1} = \text{diag}(\lambda_1^{-1}, \lambda_2^{-1}, \ldots, \lambda_{fix}^{-1})$.
6. Initialize $f_{free}$ to zero.
7. Compute $f = P_{fix} f_{fix} + P_{free} f_{free}$.
8. Compute the diagonal matrix $T = \text{diag}(|f_1|^2, |f_2|^2, \ldots, |f_{LP}|^2)$.
9. Compute $f_{free} = (P_{free}^H T P_{fix})^{-1} f_{fix}$.
10. Repeat steps 7-9 until $f_{free}$ has converged.
11. The signal vector is given by step 7.

It should be noted here that other cost functions may be used alternatively to that described above. As one example, the natural log function does not necessarily need to be taken. Still other cost functions may be appropriate, as would be apparent to one of ordinary skill in the art.

Because the image signal data received by system 20 are medical ultrasound image data, they are signals received from array elements 12 from a near field target and are broadband in frequency. Hypothetical sources are distributed over the range (P) and lateral (L) dimensions of the ROI 60. Furthermore, time records of length T are necessary to fully capture the broadband nature of the signals. Given an N element linear array, the array manifold matrix is thus of dimensions NT×LP, as described above.

Although it is possible to formulate a signal model in the frequency domain, wherein inputted signals are binned according to frequency ranges, and the above algorithm is applied sequentially to every frequency bin, wherein the array manifold matrix is constructed using complex exponential signals with different phases, the time domain approach described above that analyzes based on the time domain more fully captures the intrinsic complexity of the near-field, broadband data.

Although the above descriptions have been made with regard to a medical ultrasound imaging example, it is to be noted here that the present invention is not limited to image reconstruction of medical ultrasound images. The present systems and methods can be equally applied to other image data obtained under near-field and/or broadband conditions, such as data including, but not limited to: other types of medical imaging data, such as MRI, and imaging data for transmitting images by wireless communication. Still further, the present systems and methods can be used in target localization applications. For example, there are current systems that establish an array of microphones over a geometric area for localization of the origination of a gun shot. The present invention may be used to localize such a target with greater specificity and less noise. Similarly, the present systems and methods may be used for target localization for a specific application where a number of microphones are distributed in an array in a conference room, for example. When a particular person/speaker at a particular location in the room (space) is desired to be heard, the present system can process the signals coming from each microphone to locate that particular person's signals (speech, recorded message, telephony, etc.) at that particular location, to deliver the signals (speech) from that particular person over a public address system, while other signals from the room are effectively muted or filtered out At event 602 the region of interest (ROI) 60 is selected/defined. For example, ROI 60 can be selected or defined to correspond to the desired image region to be viewed. Once ROI 60 is selected or chosen, hypothetical sources are placed at arbitrary positions within the ROI 60. Once the distribution of hypothetical sources is defined, the array manifold matrix 66 can be evaluated by considering the spatial responses of each of those hypothetical sources.

The performance of the present invention is intimately tied to the quality of the array manifold matrix 66 used in the image/localization reconstruction. As noted above, a region of interest (ROI) 60 is selected and hypothetical sources are placed at arbitrary positions within the ROI 60 which are used to construct the array manifold matrix 66. As noted, once the distribution of hypothetical sources is defined, the array manifold matrix 66 can be evaluated by considering the spatial responses of each of those hypothetical sources. There are a variety of possible methods to distribute hypothetical sources within a given ROI.

There are a variety of possible methods to distribute hypothetical sources within a given ROI 60. One approach is to sample the ROI 60 (which could be n-dimensional) uniformly using a grid of hypothetical sources. The sampling interval for each dimension can be independent from each other.

A second approach is to first divide the ROI 60 into a finite number of sub-regions and then sample each of these sub-region independently. Finer sampling can be applied to sub-regions of interest and a coarser sampling can be applied anywhere else. This approach can be used to reduce the number of hypothetical sources required, thus reducing the size of the array manifold V 66 and ultimately reducing the computational complexity of the processing.

A third approach is to sample the ROI 60 randomly using a predefined number of hypothetical sources. The geometrical position of the hypothetical sources can be determined using any statistical distribution, such as Gaussian or Uniform distributions over the ROI 60.

Combinations of the above methods are also possible.

Those of ordinary skill in the art will appreciate that the above described methods of selection the distribution of hypothetical sources are only a representative set of approaches and by no means constitute a full disclosure of all possible methods.

At event 604, ROI 60 is subdivided into LP hypothetical sources (a collection of hypothetical sources) according to any of the different techniques described herein and each of the sources is tracked by a number from 1 to LP. An iterative process is then begun at event 606 wherein a counter is set to 1 (i.e., i=1). At event 608 signals received from hypothetical source 1 are processed to calculate the spatial response (of dimensions T×N). At event 610, the spatial response is reshaped into a TN×1 vector and assigned to a corresponding column of the array manifold matrix V 66 that is being constructed.

At event 612, the system calculated whether i=PL. If i does not equal PL, then the counter i is incremented at event 614 and processing returns to event 608 to process the next numbered hypothetical source subdivision. After all hypothetical source subdivisions have been processed, all columns of array manifold matrix V 66 are now filled, and i=PL at event 612. At this time, the NT×PL array manifold matrix V 66 is completed and can be stored at event 614 for later use in image reconstruction (or source localization) when called by system 20, or alternatively, may be used on the fly in an image reconstruction or source localization procedure.

Combinations of the methods described above may also be performed as other alternative embodiments.

Still further, using another approach, a single calibration target is placed within a calibration medium and the signals received in the sensor array are reshaped to form a single column of the array manifold matrix 66. Examples of a calibration medium that can be used include, but are not limited to: water, water/propanol solutions, gelatin mixtures, water/protein solutions, polyacrylimide gels, and other tissue mimicking phantom materials described in the medical ultrasonics literature. The calibration target is physically moved within the calibration medium and received signals are again reshaped and placed within the array manifold matrix 66 to form a second column. This process is repeated until each column of the array manifold matrix 66 is filled. As noted above, the number of columns in the array manifold matrix 66 is determined by the number of hypothetical source locations to be considered in the image reconstruction process.

In another approach to filling the array manifold matrix 66, a set of experimental data is acquired from a calibration target within a calibration medium, to form a single column of the array manifold matrix, like that described in the previous approach. Unlike the previous approach however, in this method, additional columns of the array manifold matrix 66 are formed by modifying the acquired experimental data to account for known physical effects. One such physical effect is the change in arrival time that results from a target translation. Thus, the signal received at a given sensor 12 location from a different hypothetical target location would appear to be shifted in time relative to that received from hypothetical target as originally placed at the first location. Additionally, the received signal could be modified to account for amplitude changes due to 1/r spreading (the fall in amplitude observed in a propagating wave as it travels from a discrete source due to the requirement that the total wave energy must be conserved in a non-attenuating medium; in an attenuating medium this effect is superimposed upon the additional losses due to attenuation) and variations in attenuation. Through the application of these and other well-known models the system designer can build a very reliable version of the array manifold matrix 66 without performing the tedious experiments described under the first construction method described above.

In still another approach to filling the array manifold matrix 66 a computer simulation can be used to model the signal received from a calibration target at given hypothetical target location. Such a model for ultrasound imaging can be relatively simple, such as that produced by the well known FIELD-II program [J. A. Jensen and N. B. Svendsen, "Calculation of pressure fields from arbitrarily shaped, apodized, and excited ultrasound transducers," *IEEE Transactions on Ultrasonics, Ferroelectrics, and Frequency Control*, vol. 39, pp. 262-267, 1992.] or from a more sophisticated tool such as the PZ-Flex software (Weidlinger Associates, New York, N.Y.). Such models can incorporate many of the complex propagation environments and phenomena that would be expected for realistic imaging scenarios. Such a computer model can successively fill each column in the array manifold matrix 66 by simulating the response from each target location in succession.

A potential limitation of the above approaches is that each implicitly assumes that the targets for image reconstruction lie exactly at the calibration target locations used to construct the array manifold matrix 66. Should this not be the case, as is often observed, small errors may arise in the reconstruction. One approach to mitigate such errors is to form each column of the array manifold matrix by superimposing the responses from a set or even a continuum of calibration targets distributed across some region of space. In one approach the set of calibration targets fills the area around a central target location, but does not extend to the next nearest target locations. In another approach, these calibration targets are weighted such that they emphasize the center of the target region. Such weights may be determined empirically, or they may be determined from known interpolation functions, so that in the aggregate, the target distributions used to form each column of the array manifold matrix 66 combine to uniformly weight the imaging target environment.

Best results of image reconstruction will be achieved when the calibration target has geometry and physical properties closely matching the properties of expected imaging targets. For ultrasound imaging the physical properties of mass density and compressibility would be considered particularly important. Further, best results will also be obtained when the calibration target is placed in a calibration medium having properties closely matching those expected in the imaging environment. Again considering ultrasound imaging, properties of greatest interest in the calibration medium would be speed of sound and attenuation. In cases where multiple scattering can be neglected, the present invention may also properly operate in the presence of non-linear wave propagation. If such non-linear propagation is to be considered then of course the calibration medium should have non-linear properties which closely match the desired imaging medium.

Those of ordinary skill in the art will appreciate that the above described methods of forming the array manifold matrix are only a representative set of approaches and by no means constitute a full disclosure of all possible methods.

The methods of the present invention described herein may be applied to a given received data set using a variety of iterative approaches to reduce the required computational complexity and data storage size.

In one approach the complete received data set is subdivided into multiple data segments that may or may not be uniformly sampled and may or may not overlap. This subdivision may be performed across time samples and/or across receiver elements 12 of the array 10. For each received data segment, a distinct array manifold matrix is formed to represent the responses from hypothetical sources which could contribute to the specific data segment. The present invention can then be applied separately to each of the data segments and their matched array manifold matrices. While this approach may be less optimal and more prone to error than applying these methods to the full data set, the segmented approach will reduce computational complexity and data storage requirements, thereby easing implementation.

In a second approach, the full data record is held together, but a pre-image is formed by applying the methods described using an array manifold matrix corresponding to a coarsely sampled image reconstruction. After this first image is formed, the reconstruction process can be repeated using the original received data set and a different array manifold matrix containing spatial impulse responses corresponding to hypothetical sources closely sampled about the locations where targets were identified in the previous coarsely sampled reconstructed image.

Combinations of the above methods are also possible.

Those of ordinary skill in the art will appreciate that the above described piece-wise image reconstruction methods are only a representative set of approaches and by no means constitute a full disclosure of all possible methods.

Figure 6:
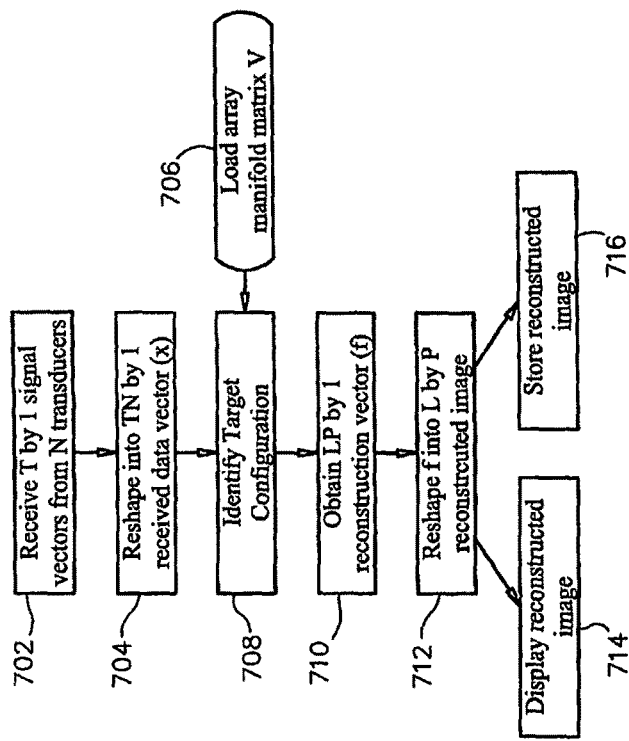
FIG. 6 is a flowchart that identifies processing steps included in one embodiment of processing image data that is obtained under near-field, broadband conditions.

FIG. 6 is a flowchart that identifies processing steps included in one embodiment of processing image data that is obtained under near-field, broadband conditions. At event 702, system 20 receives N signal vectors from N sensors/transducers, wherein each signal vector is of T by 1 dimension, where N is a positive integer, and T is the number of samples in the axial or temporal dimension. At event 704, system 20 reshapes the received signal vectors into data vector x having TN×1 dimension, as noted previously with regard to FIG. 4. At event 706, an array manifold matrix 66 having been already constructed and saved is loaded, or, alternatively, array manifold matrix 66 is constructed according to one of the techniques described above.

Now that the system 20 has x and V, system 20 identifying a hypothetical target configuration that, when applied to the array manifold matrix, matches the data vector, thereby matching the data x 68 to the signal model V to solve for the position and intensity of the real sources (i.e., targets 2) at event 708. One example of such identification processing is to apply the MAP algorithm in a manner as described above. At event 710, the system 20 obtains the reconstruction vector (f vector 72) by the processing described at event 708. The reconstruction vector is of dimension LP×1. At event 712, the reconstruction vector f is reshaped into an L×P matrix to form the reconstructed image 74 (e.g., see FIG. 4). The reconstructed image 74 is then outputted for viewing by a user at event 714, such as by displaying it on a computer monitor or printing it out on paper, for example (or transmitting to another computer station for display) and/or stored in system storage 28 and/or 32 and/or storage 30 at event 716.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. distances, frequencies, dB, etc.) but some experimental errors and deviations should be accounted for. A series of computer simulations were performed using Matlab and Field II. As used herein, matrices are represented using underlined upper-case italic characters such as X, while vectors are represented using underlined lower-case italics such as x. Superscripts H and T represent conjugate transpose and regular transpose, respectively.

Example 1

Beamplots

Figure 7:
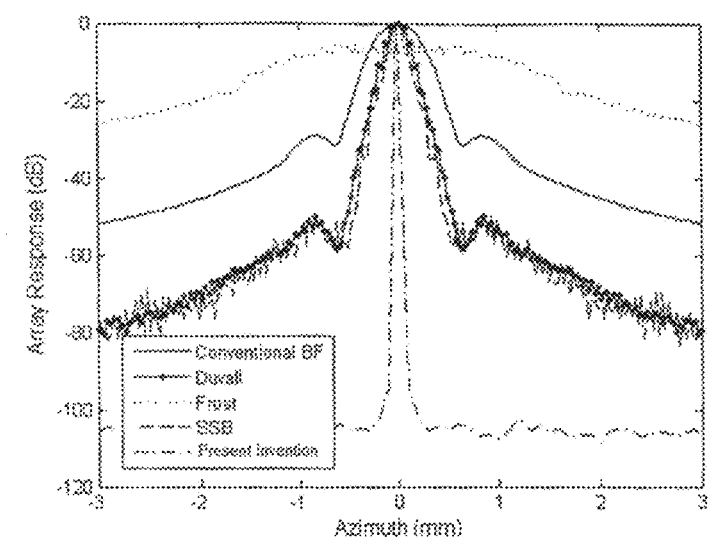
FIGS. 7 and 8 show results from the "BEAMPLOTS" Example 1, described below.
Figure 8:
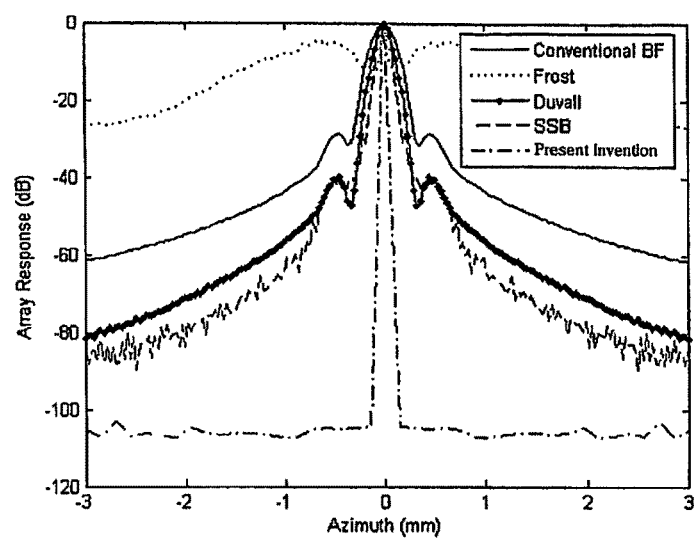

A series of adaptive algorithms (Frost, Duvall, SSB, and an adaptive algorithm according to an embodiment of the present invention) were compared directly to the conventional delay-and-sum beamforming. Beamplots were generated for a 32 and a 64 element array. The array was operating at 5 MHz with roughly 70% fractional bandwidth. For calculation of the array manifold matrix 66, hypothetical sources were placed every 20 μm in range and every 100 μm in azimuth for the 32 elements array, shown in FIG. 7, and every 150 μm in azimuth for the 64 element case, shown in FIG. 8. In this and the following simulations, data was first demodulated to obtain IQ signals from which processing according to the present invention was performed.

Example 2

Point Targets

Figure 9A:
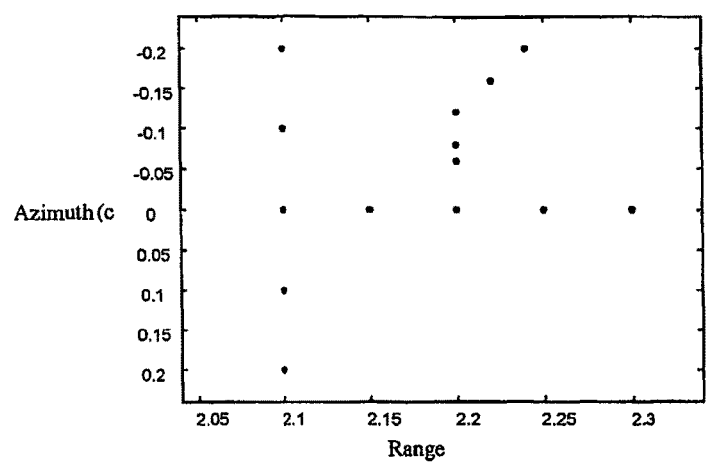
FIGS. 9A-9C show targets and comparisons of imaging methods described in Example 2 below.
Figure 9B:
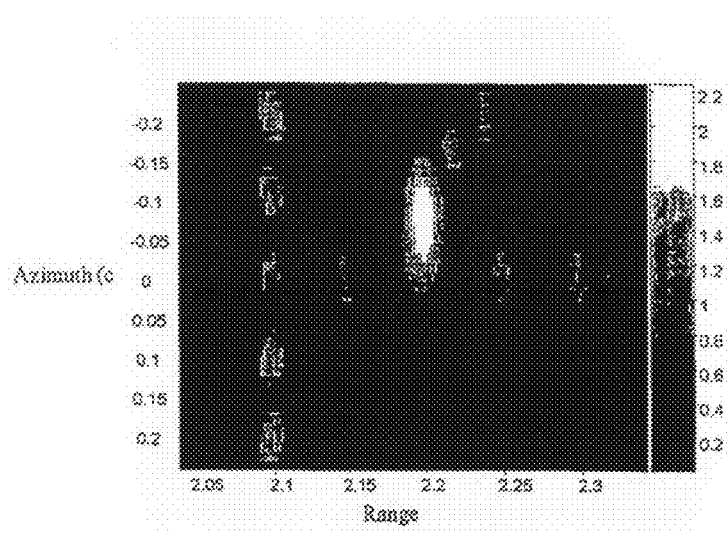
Figure 9C:
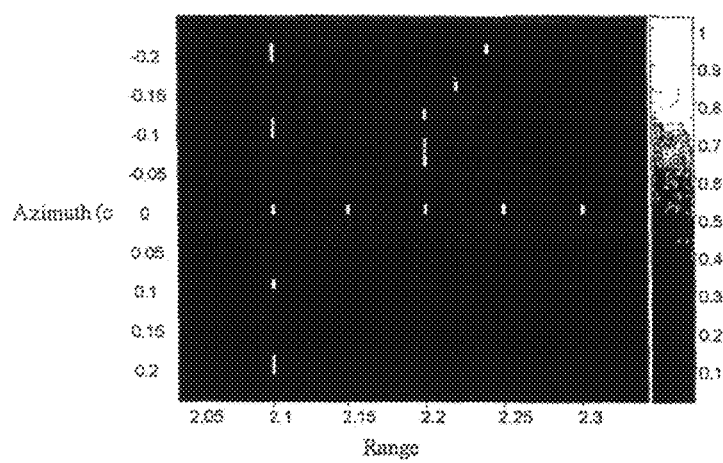

A series of point targets were distributed within a 4×5 mm region in range and azimuth, respectively. A 33 element linear array operating at 5 MHz with element spacing of 150 μm was simulated. The final sampling frequency was set at 40 MHz. A plane wave was used on transmit for both the conventional beamforming and the processing according to the present invention. Conventional beamforming was applied on the received RF data using Hann apodization and dynamic receive focusing. Apodization is a signal processing technique used in medical ultrasound to generate images with lower side-lobe level at the price of coarser main-lobe resolution. For the processing according to an embodiment of the present invention, the image region was discretized into a series of hypothetical targets separated 20 μm in range and 120 μm in azimuth. The positions of the hypothetical sources were chosen so that some, but not all coincided with the positions of the actual point targets. The spacing between the point targets ranged between 1 mm and 200 μm in both dimensions. FIG. 9A shows the spatial distribution of the point targets. FIG. 9B shows the image constructed by the conventional delay-and-sum beamforming technique, and FIG. 9C shows the reconstructed image produced by application of an embodiment of the present invention.

Example 3

Figure 10A:
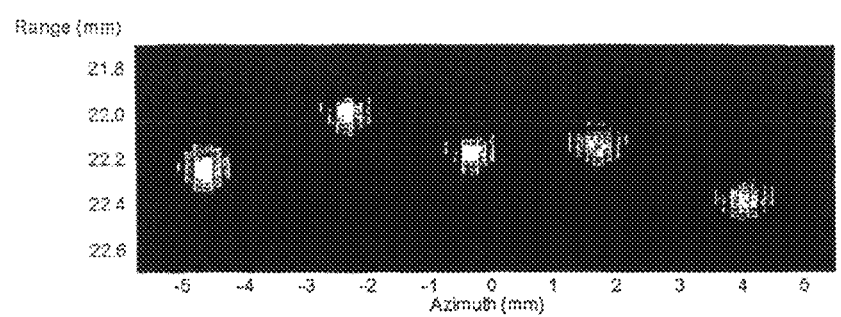
FIGS. 10A and 10B compare a conventional beamformed image with an image formed according to the present invention, and as described in Example 3 below.
Figure 10B:
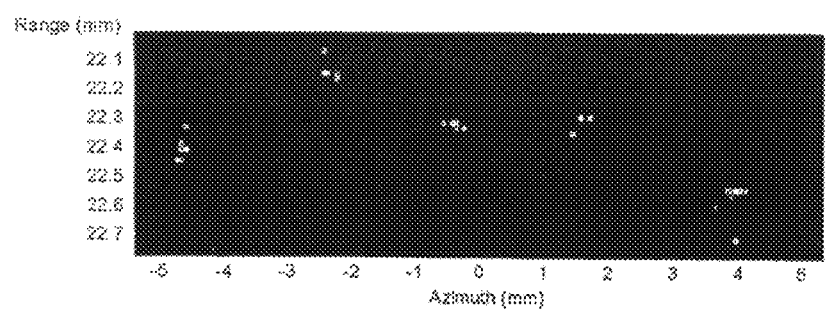

Wire Targets 5 wires (20 μm in diameter) in a water bath. FIG. 10A shows the output of a Philips SONOS 5500 ultrasound imaging system. FIG. 10B shows the image of the five wires as reconstructed by the present invention. Hypothetical sources were placed every 20 microns axially (range) and every 67 microns laterally (azimuth).

Example 4

Anechoic Cyst

Figure 11A:
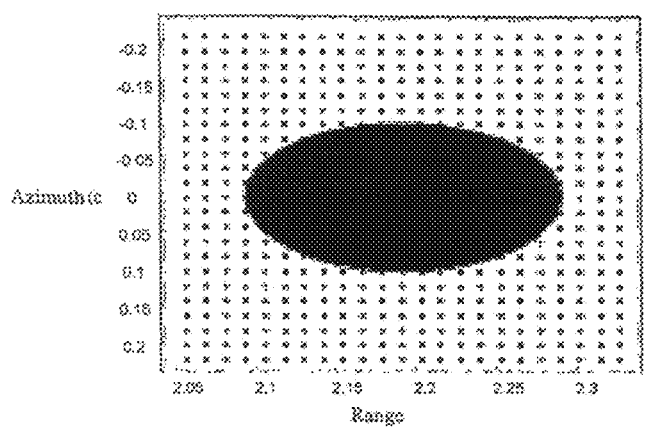
FIG. 11A shows a schematic of a cyst phantom, in connection with Example 4 described below.
Figure 11B:
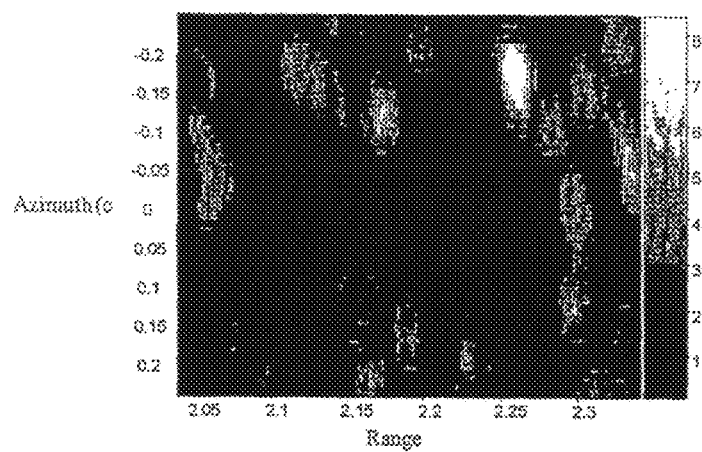
FIG. 11B shows an image of the anechoic cyst described in Example 4, as formed by a conventional beamforming method.
Figure 11C:
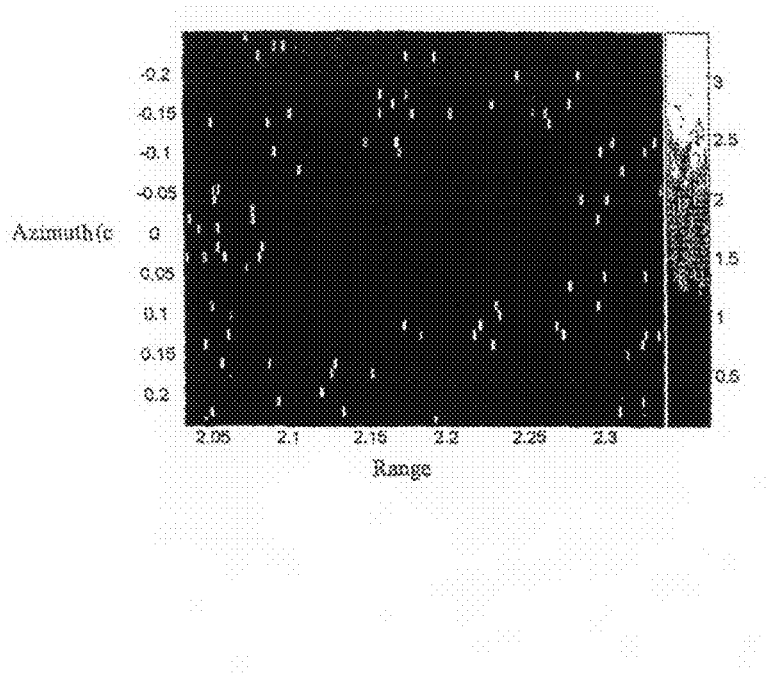
FIG. 11C shows an image of the anechoic cyst described in Example 4, as reconstructed by a method according to the present invention.

A 1 mm radius anechoic cyst was placed in front of the array and surrounded by ultrasonic scatterers uniformly distributed within the image region. Scatterers' amplitudes followed a Gaussian distribution with zero mean and standard deviation equal to one. Simulation methods were the same as those described in Example 2 above, except that the hypothetical source sampling was reduced to 100 μm in azimuth. Again, the positions of the scatterers did not necessarily coincide with the position of the hypothetical sources. FIG. 11A shows a schematic of the cyst phantom. FIG. 11B shows the image constructed by the conventional delay-and-sum beamforming technique, and FIG. 11C shows the reconstructed image produced by application of an embodiment of the present invention.

Example 5

Algorithm Robustness

Figure 12A:
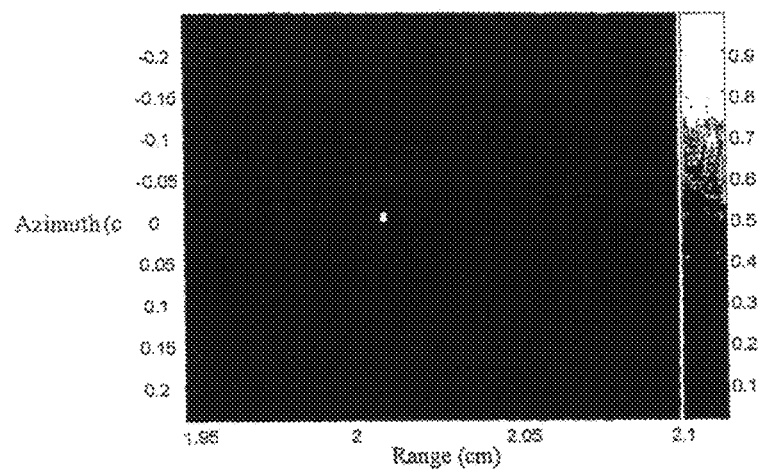
FIG. 12A shows a reconstructed image where no noise was added.
Figure 12B:
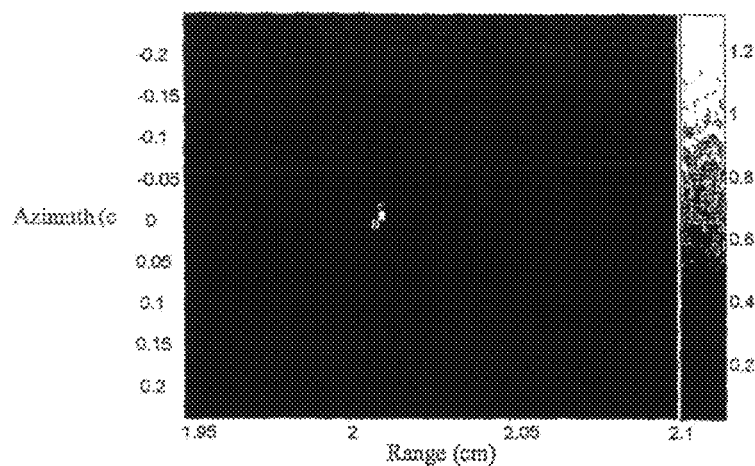
FIGS. 12B, 12C and 12D show examples of the image shown in FIG. 12A, but where 30 dB, 20 dB, and 10 dB signal-to-noise ratios (SNR) per channel were applied, respectively.
Figures 12C, 12D:
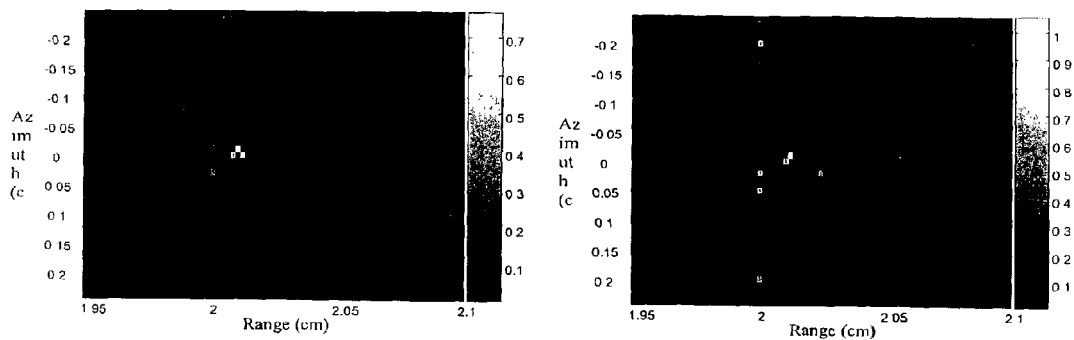

The examples described above were performed under ideal, noiseless conditions. This example provides simulations that were performed to test the robustness of the processing algorithm, including the array manifold matrix, calculated by the embodiment of the present invention used in the examples. The same simulation parameters that were used for the anechoic cyst example, (Example 3 above) were used in this example, except that Gaussian noise was added to each receive channel. Before summation, the noise was band-passed using a 101 taps FIR filter to match the bandwidth of the received RF signals. FIG. 12A shows the reconstructed image where no noise was added, and FIGS. 12B, 12C and 12D show examples where 30 dB, 20 dB, and 10 dB signal-to-noise ratios (SNR) per channel were applied, respectively.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto. Further in this regard, while most embodiments above have been described in the context of supplanting the beamforming operation of conventional imaging systems, those knowledgeable in the art will realize that the present invention applies equally to data after a beam formation process has already been applied. In such application, each column of the array manifold matrix can be constructed by reshaping the RF image output from the beamformer for a calibration target at a particular location. Successive columns of the array manifold matrix can be constructed by moving the calibration target location, acquiring a full RF image, and reshaping that image into a column vector form. With an entire array manifold matrix assembled, the present invention can be applied to form a high resolution image of a real target distribution by considering the reshaped acquired RF image as the received data vector. Many modifications of this specific process are possible in manner analogous to those described for application in place of a conventional beamformer.

The preceding discussion has described application of the present invention under a variety of operating conditions. Those of ordinary skill in the art will appreciate that many permutations of conditions not explicitly described above are also possible. For example, the present invention may be applied to pulse-echo imaging systems utilizing or not utilizing a focused transmit beam. While the use of a focused transmit beam might enhance image contrast, it would also likely increase computational complexity, as each transmission would generally require its own image reconstruction operation. While the data from multiple transmissions could be grouped into one large reconstruction, this approach is not generally desirable as it requires an extremely large memory space within the image reconstruction hardware. In another simple variation of the invention it could be applied to data either with or without the application of receive focusing delays. Either case is equally viable with the present invention, so long as the array manifold matrix is constructed using the same focusing scheme (or lack thereof) as the data to be used in image reconstruction. In some applications prefocusing the data may reduce the required time record length for a high quality image reconstruction and thereby allow the use of smaller memory, easing implementation.

What is claimed is:

1. A processor circuit-implemented method of reconstruction of target locations and amplitudes from signals received from one or more real targets in a space, wherein the signals are at least one of signals received from the near-field and broadband signals, said method comprising the steps of:
    receiving one or more signal vectors representative of the signals received from the one or more real targets in the space, the signals obtained using an array of sensors;
    using at least one processor circuit, programmed for modeling the space as a region of interest;
    using the at least one processor circuit, programmed for calculating an array manifold matrix from signals received from hypothetical targets in the region of interest;
    using the at least one processor circuit, programmed for reshaping the one or more signal vectors received from the one or more real targets into a data vector;
    using the at least one processor circuit, programmed for identifying a hypothetical target configuration that, when applied to a signal model comprising the array manifold matrix, matches the data vector, and calculating a reconstruction vector using information about the identified hypothetical target configuration;
    using the at least one processor circuit, programmed for reshaping the reconstruction vector into a reconstructed representation of the real targets in the space; and
    using the at least one processor circuit, programmed for performing at least one of outputting the reconstructed representation for viewing by a user, and storing the reconstructed representation for later use.

2. The method of claim 1, wherein the reconstructed representation is a reconstructed image of the real targets in the space.

3. The method of claim 1, wherein the reconstructed representation is used for localization of the real targets in the space.

4. The method of claim 1, wherein the real targets are targets within a patient's tissue, and the reconstructed representation is a reconstructed ultrasonic image.

5. The method of claim 1, wherein the data vector is calculated from temporal waveforms of the signal vectors received.

6. The method of claim 1, wherein the data vector is calculated from frequency domain representations of the signal vectors received.

7. The method of claim 1, wherein said identifying comprises applying a MAP algorithm to the data vector and signal model.

8. The method of claim 1, wherein the real targets are in a near-field space.

9. The method of claim 1, wherein signals making up the signal vectors received are broadband signals.

10. The method of claim 1, wherein said calculating an array manifold matrix comprises:
    (a) placing a single calibration target in the region of interest;
    (b) reshaping signals received from the single calibration target to form a single column of the array manifold matrix;
    (c) moving the single calibration target to a different location in the region of interest;
    (d) reshaping signals received from the single calibration target in its current location to form another column of the array manifold matrix; and
    (e) repeating steps (c) and (d) until all columns of the array manifold matrix have been filled.

11. The method of claim 1, wherein said calculating an array manifold matrix comprises:
    (a) placing a single calibration target in the region of interest;
    (b) reshaping signals received from the single calibration target to form a single column of the array manifold matrix;
    (c) modifying the signals received from the single calibration target to account for a known physical effect;
    (d) reshaping the modified signals to form another column of the array manifold matrix; and (e) repeating steps (c) and (d) until all columns of the array manifold matrix have been filled.

12. The method of claim 1, wherein said calculating an array manifold matrix comprises: performing a computer simulation to model signals received from a calibration target at various hypothetical target locations, and reshaping the computer signals simulated from the various hypothetical target locations to form columns of the array manifold matrix, wherein each column of the array manifold matrix is generated from signals simulated from each different hypothetical target location, respectively.

13. The method of claim 1, wherein the hypothetical targets each comprise a set or a continuum of calibration targets filling an area around a central target location.

14. The method of claim 13, wherein the calibration targets are weighted to emphasize said central target location.

15. The method of claim 1, wherein signals making up the signal vectors from the one or more real targets are from non-linearly propagating waves emitted or reflected from the one or more real targets.

16. The method of claim 1, wherein said outputting comprises superimposing the reconstructed representation on an image formed using a different method than that recited in claim 1, or modifying the image formed using a different method with the reconstructed representation.

17. A system for reconstructing target locations and amplitudes from signals received from one or more real targets in a space, wherein the signals are at least one of signals received from the near-field and broadband signals, said system comprising:
a processor;
an interface configured to receive a signal vector representative of the signals received from the one or more real targets in the space, the signals provided by an array of sensors;
programming configured to perform the following steps:
modeling the space as a region of interest;
calculating an array manifold matrix from signals received from hypothetical targets in the region of interest;
reshaping the one or more signal vectors received from the one or more real targets into a data vector;
identifying a hypothetical target configuration that, when applied to a signal model comprising the array manifold matrix, matches the data vector, and calculating a reconstruction vector using information about the identified hypothetical target configuration;
reshaping the reconstruction vector into a reconstructed representation of the real targets in the space; and
at least one of a storage device for outputting to and storing the reconstructed representation; or an interface for outputting the reconstructed spatial representation for viewing by a user.

18. The system of claim 17, further comprising the array of sensors for receiving signals emitted from or reflected by the real targets.

19. The system of claim 17, further comprising a storage device for storing signals received from the real targets, wherein the processor receives the signals from the storage device via said interface for processing offline.

20. The system of claim 17, wherein the processor receives the signals for direct processing after sensing by said sensors and intermediate signal processing by the system.

21. The system of claim 17, wherein said sensors are ultrasonic sensors configured for medical ultrasonic imaging.

22. The system of claim 17, wherein the system is configured for reconstructing target locations and amplitudes from signals received from one or more real targets in a near-field space.

23. The system of claim 17, wherein the signals originating from the one or more real targets are broadband signals.

24. The system of claim 17, wherein the signals received by the processor have been previously processed for image reconstruction by an image processing algorithm different from that recited in claim 17.

25. A non-transitory computer readable storage medium carrying one or more sequences of instructions for reconstructing signal spatial representation of signals received from one or more real targets in a space, wherein execution of one or more sequences of instructions by one or more processors causes the one or more processors to perform the steps of:
receiving one or more signal vectors representative of the signals received from the one or more real targets in the space, the signals obtained using an array of sensors;
reshaping the one or more signal vectors received from the one or more real targets into a data vector;
identifying a hypothetical target configuration that, when applied to a signal model comprising an array manifold matrix, matches the data vector, and calculating a reconstruction vector using information about the identified hypothetical target configuration;
reshaping the reconstruction vector into a reconstructed spatial representation of the space; and
outputting the reconstructed spatial representation of the space for viewing by a user;
wherein the space is modeled as a region of interest; and
wherein the array manifold matrix is calculated from signals received from hypothetical targets in the region of interest.

* * * * *